Figure 1:
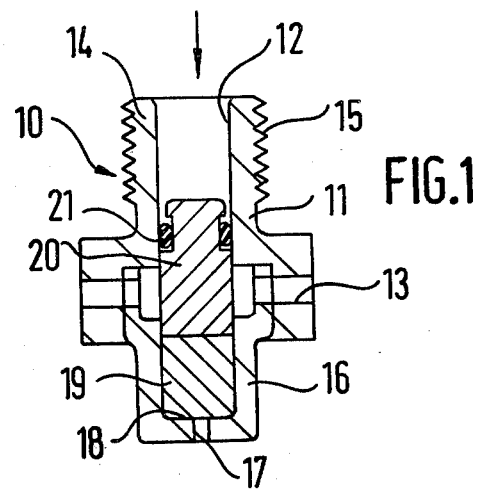

United States Patent [19]

Harvey et al.

[11] 4,221,231
[45] Sep. 9, 1980

[54] THERMAL FUSE DEVICE

[75] Inventors: Samuel E. Harvey, Coventry; Philip H. Pegram, Leamington Spa, both of England

[73] Assignee: Dunlop Limited, London, England

[21] Appl. No.: 955,346

[22] Filed: Oct. 27, 1978

Related U.S. Application Data

[62] Division of Ser. No. 769,701, Feb. 17, 1977, abandoned.

[30] Foreign Application Priority Data

Feb. 27, 1976 [GB] United Kingdom ............... 77881/76

[51] Int. Cl.³ ............................................. F16K 17/38
[52] U.S. Cl. ................................. 137/72; 152/427; 220/89 B
[58] Field of Search ............................. 137/72–77; 169/57; 220/89 B; 152/427

[56] References Cited

U.S. PATENT DOCUMENTS

| 1,243,998 | 10/1917 | Smyly ....................... 137/75 |
| 1,886,454 | 11/1932 | Sutherland ................. 137/75 |
| 1,919,508 | 7/1933 | Griffith ..................... 137/72 X |
| 3,618,627 | 11/1971 | Wagner ..................... 137/72 X |
| 3,638,733 | 2/1972 | DeRouville et al. ........ 169/19 |
| 3,720,220 | 3/1973 | McMath .................... 137/75 |
| 3,734,115 | 5/1973 | McMath .................... 137/517 X |
| 3,842,853 | 10/1974 | Kelly et al. ................. 137/72 X |

Primary Examiner—Martin P. Schwadron
Assistant Examiner—Richard Gerard
Attorney, Agent, or Firm—Stevens, Davis, Miller & Mosher

[57] ABSTRACT

A thermal fuse device for deflating a pneumatic tire in the event of high temperature has an outlet for the molten eutectic plug which is separated from the air outlet so that venting air will not tend to re-solidfy the eutectic. The eutectic plug abuts a step or shoulder to prevent "creep".

9 Claims, 3 Drawing Figures

THERMAL FUSE DEVICE

This is a division of application Ser. No. 769,701 filed Feb. 17, 1977 now abandoned.

The present invention relates to an improved thermal fuse device for venting a pressurized fluid to a passage therefor when a plug or billet of a fusible composition incorporated in the device is raised to a predetermined temperature, the device being particularly, although not exclusively, suitable for incorporation in the rim of a pneumatic tire and wheel rim assembly to relieve tire pressure in the event that the temperature of the assembly rises to a potentially dangerous level.

It has been known for many years that it is desirable, especially in the case of aircraft wheels, to provide a safety device to prevent explosion of the tire as a result of its exposure to a high temperature, for example generated by an associated brake. The need for such a safety device becomes greater as aircraft are braked from higher speeds and more efficient brakes produce greater heat, especially in exceptional conditions such as when take off is aborted and the now stationary wheel is subject particularly in its upper region to heat radiated by and conducted from nearby brake discs having high energy absoprtion characteristics.

British Pat. Specifications Nos. 878,973, 963,392, 975,559 and 1,036,138 and U.S.A. Patent No. 3,157,219 disclose various proposals for utilizing an eutectic plug which will melt at the critical temperature allowing the air pressure of the tire to be relieved through a passage vacated by the plug. In British Patent Specification No. 878,973 the problem of "creeping" of the eutectic material is referred to and the solution offered is to locate the eutectic plug in a passage with a 4° taper. Although an eutectic material is one which has a sharply defined melting point there is a danger that in use the eutectic plug will be raised repeatedly to a temperature near to its melting point causing a temporary loss of solidity which may be sufficient to cause progressive extrusion of the plug from the passage under the influence of air pressure in the pneumatic tire. This problem is again referred to in British Pat. No. 1,036,138 which discloses a device in which a visual indication is given when "creep" has occurred beyond tolerable limits.

"Creep" of the eutectic plug can cause it to be deformed, without ever fully changing from the solid to the liquid state, until a tiny hole is formed through the eutectic plug or between it and the wall of the passage, through which pressurized air from the tire can leak. The effect of passage of air past the plug is, however, to cool and harden the eutectic plug with the result that the hole is not enlarged and may even be temporarily reclosed with the result that the tire is slowly and progressively deflated without the fuse device ever operating in the intended manner to avert danger.

This major problem in the use of such thermal fuse devices is to some extent overcome in arrangements such as described in British Pat. Nos. 963,392 and 975,559 wherein the eutectic plug is followed through the air passage by a plunger or piston which has a higher melting point than the eutectic plug. It has been proposed that the plug should take the form of a rod extending transversely across the air passage below the piston and not filling the air passage, the opposite end of the rod being engaged in apertures opening to the passageway. Such arrangements go some way toward overcoming the leakage problem in that no air will escape until the eutectic plug has been liquified or deformed sufficiently to allow the plunger to be expelled from the air passage, ensuring that there will be no air leakage unless and until the device operates rapidly to deflate the tire.

However even such arrangements as have a piston following the eutectic plug through the air passage will eventually fail through "creep" of the eutectic material if the device is frequently brought near to the melting temperature of the eutectic without the danger situation which the device is intended to safeguard ever arising. One of the factors contributing to this in prior art proposals utilizing a plunger sealing the air passage behind the eutectic plug is that the eutectic plug spanning the air passage through the device has a relatively large unsupported area on its downstream face so that it can progressively deform in the air passage. Another principal drawback of prior art devices is that since the eutectic plug is located in the air passage there is also the danger that air under pressure venting through the passage will cool and resolidify eutectic material remaining in the passage which may at least partially obstruct the air flow and inhibit the desired rapid deflation of the tire.

To summarize, it is desirable that the device should not function except in the presence of a predetermined, critical temperature whereupon it should function to deflate the tire as rapidly as possible.

It is a principal object of the present invention to provide an improved thermal fuse device.

In accordance with one aspect of the present invention there is provided a thermal fuse device for venting a pressurized fluid through a passage therefor in the device when a plug of a fusible composition incorporated in the device is raised to a predetermined temperature, the device comprising a control element movable between a position closing and a position opening said passage, the control element being arranged to be biased toward the opening position and the plug being positioned to obstruct, when in its solid state, movement of the control element away from the passage closing position, there being provided in the device distinct from said passage an outlet through which the fusible composition can flow when melted to allow movement of the control element away from the closing position, the arrangement being such that when the device operates as a result of melting of the plug the melted fusible composition is not subject to venting fluid moving relative thereto in said passage.

According to another aspect of the invention there is provided a thermal fuse device for venting a pressurized fluid through a passage therefor in the device when a plug of a fusible composition incorporated in the device is raised to a pre-determined temperature, the device comprising a control element movable between a position closing and a position opening said passage, the control element being arranged to be biased toward the opening position and the plug being positioned to obstruct, when in its solid state, movement of the control element away from the passage closing position, wherein the plug, when in its solid state, is held in the device by retaining means spaced from said passage by the control element, the arrangement being such that when the device operates as a result of melting of the plug the melted fusible composition is not subject to venting fluid moving relative thereto in said passage.

In the device of the immediately preceding paragraph the retaining means is preferably constituted by a chamber having a restricted outlet for the fusible composition when melted, said outlet opening at a position remote from the portion of said passage through which the control element moves from its closing to its opening position. Preferably the outlet is of reduced cross-sectional area relative to the chamber so that the chamber communicates with the outlet over a step or shoulder having a flat surface abutted by the plug and opposed to the direction of flow of the melted composition from the chamber through the outlet.

The control element may be engaged by a latch element extending between the chamber and a recess in the control element, the latch tending to move into the chamber under the influence of the bias of the control element when permitted to do so by molten fusible composition vacating the chamber through the outlet.

The fusible composition is preferably an eutectic metal, by which is meant a metal having a sharply defined melting point.

The control element may be arranged in the fluid passage to be biased by the pressurized fluid or alternatively it may take the form of a valve spool biased by alternative biasing means such as a spring to move between a passage closing position in which it is retained by the plug and a passage opening position.

The outlet for the melted fusible composition may be located in any chosen position in the device such that melted fusible composition will not remain in the said venting passage to be cooled and hardened by venting fluid after the control element has moved to open the passage.

Figure 2:
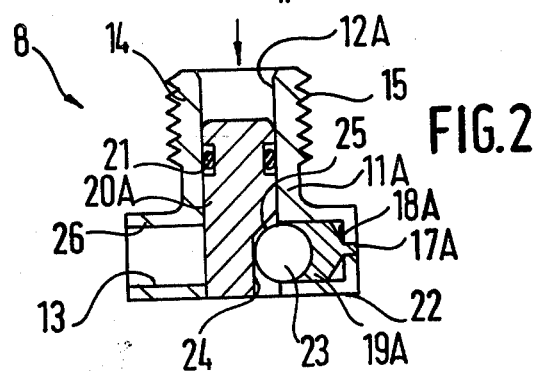
Figure 3:
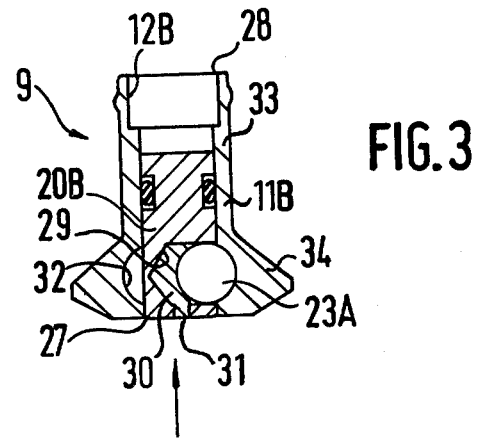

Preferred embodiments of the invention will now be described with reference to the accompanying diagrammatic drawings, in which:

FIGS. 1, 2 and 3 are similar longitudinal sectional views of respective thermal fuse devices in accordance with the invention.

In the embodiment of the invention illustrated in FIG. 1 a thermal fuse device 10 comprises a cruciform housing 11 having a longitudinal bore 12 crossed by a transverse bore 13. The branch 14 of the housing 11 is externally screw threaded at 15 to engage in a screw-threaded aperture (not shown) of an aircraft wheel rim on which a tubeless pneumatic tire is mounted so that the bore 12 in the branch 14 will be in communication with the cavity defined by the rim and the inner surface of the tire.

At the free end of the branch 16 of the housing 11 aligned with the branch 14 the diameter of the bore 12 is reduced to provide an end opening 17 in communication with the bore 12 over an annular step or shoulder 18 which presents a flat surface inwardly of the bore 12. This is abutted by a billet 19 of an eutectic material filling the end portion of the bore 12.

Freely slidable in the bore 12 and located against the billet 19 is a control element in the form of a piston or plunger 20 and it and the billet 19 are so dimensioned that the piston 20 extends across the junction between the bores 12 and 13. Near to its end remote from the billet 19 the piston 20 is surrounded by an O-ring 21 in an annular recess in the piston, the seal of the O-ring 21 between the piston 20 and the bore 12 in the branch 14 serving to prevent leakage of air past the piston 20 from the bore 12 into the bore 13.

In use the device 10 is mounted in an aircraft wheel and the eutectic material of the billet 19 is chosen to have a melting point which corresponds with a temperature which is potentially dangerous for a tire mounted on the wheel. If such a temperature is reached the material of the billet 19 will be converted from the solid to a liquid state and the piston 20 will then displace the eutectic material through the opening 17 as it moves toward the surface 18 under the influence of air pressure in the tire. As soon as the O-ring 21 clears the inner end of the bore 12 in the branch 14 of the housing the pressurized air in the tire will be vented through the two branches of the transverse bore 13.

Since the eutectic material flowing through the opening 17 is isolated from pressurized air venting from the tire by the piston 20 it will not be cooled and hardened by the air flow. The flat surface 18 confronting the billet 19 will tend to prevent the billet progressively losing its shape as a result of being brought repeatedly to a temperature near to its melting point so that the device 10 will not function to discharge air from the tire unless the material of the billet 19 is fully changed from the solid to the liquid state.

The thermal fuse device 8 illustrated in FIG. 2 is similar to the device 10 of FIG. 1, like parts having like reference numerals, except that the housing 11A is T-shaped, the branch 16 being omitted. At the free end of one branch 22 the transverse bore 13 is reduced in diameter to provide an outlet opening 17A communicating with the bore 13 over a step or shoulder 18A and between this and the piston 20 is located a billet 19A of eutectic material and a latch member in the form of a metal ball 23. The ball 23 extends between the chamber for the eutectic plug 19A defined by the portion of the bore 13 in the branch 22 and a recess 24 cut into the piston 20 and opening to the end of the piston 20 located at the end of the bore 12 remote from the branch 14.

When the plug 19A of eutectic material is in its solid state it prevents movement of the ball 23 into the chamber in the branch 22 which in turn prevents movement of the piston 20 downward from the position shown to be expelled from the bore 12 by air pressure in the associated tire. However, the inner end of the recess 24 in the piston is in the form of an incline, cam surface 25 which, under the influence of air pressure behind the piston 20, will cause displacement of the ball 23 into the chamber of the branch 22 when the material of the plug 19A is liquified. By flowing out of the opening 17A the eutectic permits the ball 23 to move into the chamber, whereupon air pressure behind the piston 20A expels it from the bore 12A to allow deflation of the tire through bores 12A and 13.

It will be noted that in this arrangement also the chamber containing the solid eutectic plug is isolated from the bore 12 by the piston 20. When the piston 20 has moved sufficiently far out of the bore 12A to communicate the latter with the bore 13 in the branch 26 of the housing air will flow out of the associated tire through the communicating bores 12 and 13 and the passage for the outflowing air thus provided cannot be obstructed by a residual eutectic material in the chamber or outlet 17A.

The third thermal fuse device illustrated in FIG. 3 resembles the device 8 of FIG. 2 in possessing a metal ball 23A serving as a latch between the housing 11B and the piston 20B but here the housing has a single bore 12B in which the piston 20B is movable from the end 27 to the end 28 of the bore by air pressure in the associated tire. A chamber 29 is formed in the piston 20B and a plug 30 of eutectic material is located in the chamber to be abutted by the ball 23A, the chamber 29 having a diameter approximately equal to that of the ball 23A and having a reduced diameter outlet branch 31 which, in use of the device, opens to the end of the piston 20B exposed to air pressure within the associated tire. The dimensions of the plug 30 and ball 23A are chosen so that the ball 23A extends out of the chamber 29 into a recess 32 of semi-circular section in the housing 11B surrounding the piston 20B, the dimensions of the recess 32 being such that in the assembled condition as shown the center of the ball 23A is located within the chamber 29.

In use the device 9 of FIG. 3 is mounted in an aircraft wheel rim by passing the shank 33 of the housing through an aperture of the rim (not shown) until the rim is engaged by the flange 34 of the device to form an air-tight seal.

The end of the piston 20B opposite that having the opening 31 is thus subject to air pressure in the tire mounted on the rim tending to force the piston 20B out of the end of the housing opposite the end 28 but the piston is prevented from so moving by latching of the ball 23A in the recess 32. If the plug 30 of eutectic material is liquified the ball 23A can move inwardly of the chamber 29 under the cam action on the ball of the recess 32 until the piston 20B is free to be moved by the air pressure out of the bore 12B.

It will be noted that the relationship of the outlet 31 to the interior of the chamber 29 is such that mere deformation of the plug 30 before it becomes liquid is resisted by the surrounding surfaces of the piston 20B and of the ball 23A. It will also be noted that the outlet opening 31 is considerably smaller in cross-sectional area than the bore 12B and is spaced from the wall of the housing 11B defining the bore 12B by the end surfaces of the piston 20B in which the outlet 31 is formed. The effect of this arrangement is that liquid eutectic material discharged from the opening 31 accumulates on the piston end without extending right across the bore 12B. More importantly, however, since the outlet 31 is in the end of the piston 20B presented toward the tire cavity there will at no time be a rapid flow of discharging air over eutectic material on the piston end so long as the piston 20B remains in the bore 12B.

Each of the above thermal fuse devices therefore has the advantage that the outlet 17, 17A or 31 for melted eutectic material is distinct from the passage 12, 13 or 12A, 13 or 12B through which air will be vented from a tire and vented air will not flow over melted eutectic material tending to cool and harden the same. In each embodiment, also, the eutectic material is contained in a chamber which will tend to prevent progressive deformation of the plug or billet of eutectic material and which will allow escape of the eutectic material through the outlet 17, 17A or 31 only when the eutectic material has been liquified.

Having now described our invention what we claim is:

1. A thermal fuse device for deflating a pneumatic tire in response to a predetermined increase in temperature, the device comprising a housing having a passage for venting air from the tire, a control element movable in the passage between a position closing and a position opening the passage and biased only by pneumatic pressure in the tire when the housing is attached thereto towards the opening position, a latch element positioned to obstruct movement of the control element to the opening position and being urged toward a non-obstructing position by axial movement of the control element toward the opening position, a plug of a fusible composition positioned to obstruct movement of the latch element and an outlet discreet from said passage through which the fusible composition can flow when melted without being cooled by air venting through the passage, the arrangement being such that the control element moves between positions fully closing and fully opening the passage in response to displacement of the latch element by the movement of the control element permitted by melting of the plug.

2. A device as claimed in claim 1 in which said outlet has its opening at a position remote from the portion of said passage through which the control element moves from its closing to its opening position.

3. A device as claimed in claim 2, wherein the outlet is of reduced cross-sectional area relative to a chamber receiving the plug so that the chamber communicates with the outlet over a step having a flat surface abutted by the plug and opposed to the direction of flow of the melted composition from the chamber through the outlet.

4. A device as claimed in claim 3 wherein the latch element extends between the chamber and a recess in the control element, the latch element tending to move into the chamber under the influence of the bias of the control element when permitted to do so by molten fusible composition vacating the chamber through the outlet.

5. A device as claimed in claim 1 wherein the fusible composition is an eutectic metal.

6. The device of claim 1 in which said passage is open at its distal end so that the control element is expelled therefrom when the latch element is displaced.

7. A thermal fuse device for deflating a pneumatic tire in response to increase in temperature, the device comprising:
   a housing having a passage therethrough for venting the tire, a piston mounted for axial movement therein between a position closing and a position opening the passage;
   said piston being positioned to be biased toward the opening position only by the pneumatic pressure of a tire when the housing is attached thereto;
   a chamber in one of said housing and piston which is remote from, and not in fluid communication with said passage and having an outlet discreet from said passage, said chamber extending substantially transverse to the axis of said passage;
   a ball of hard high melting point material partially in said chamber and partially projecting therefrom to obstruct the axial movement of the piston toward the opening position and being urged toward said discrete outlet by axial movement of the piston toward the opening position;
   a plug of fusible material in the chamber directly against the ball and between the ball and the outlet thus holding the ball in its obstructing position when the fusible material is in the solid state but permitting the ball to be moved by the movement of the biased piston to a non-obstructing position when in the liquid state, the liquid then flowing out of said outlet without being cooled by air venting through the passage.

8. The device of claim 7 in which said passage is open at its distal end so that the piston is expelled therefrom when the latch element is displaced.

9. The device of claim 7 in which the piston has a recess in one side to receive a portion of the ball and the chamber is directly opposite said recess, the diameter of the chamber being approximately equal to the diameter of the ball.

* * * * *